United States Patent
Bhargava et al.

(10) Patent No.: US 12,332,481 B2
(45) Date of Patent: *Jun. 17, 2025

(54) BIASED TOTAL THICKNESS VARIATIONS IN WAVEGUIDE DISPLAY SUBSTRATES

(71) Applicant: Magic Leap, Inc., Plantation, FL (US)

(72) Inventors: Samarth Bhargava, Saratoga, CA (US); Christophe Peroz, Tokyo (JP); Victor Kai Liu, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,762

(22) Filed: Nov. 9, 2023

(65) Prior Publication Data
US 2024/0077676 A1  Mar. 7, 2024

Related U.S. Application Data

(63) Continuation of application No. 17/938,869, filed on Oct. 7, 2022, now Pat. No. 11,860,416, which is a
(Continued)

(51) Int. Cl.
*G02B 6/10* (2006.01)
*F21V 8/00* (2006.01)
(Continued)

(52) U.S. Cl.
CPC ............ *G02B 6/13* (2013.01); *G02B 6/0046* (2013.01); *G02B 6/122* (2013.01); *G02B 6/1221* (2013.01);
(Continued)

(58) Field of Classification Search
CPC .................................................. G02B 6/0046
See application file for complete search history.

(56) References Cited

U.S. PATENT DOCUMENTS

| 5,555,160 A | 9/1996 | Tawara et al. |
| 5,888,122 A | 3/1999 | Gupta et al. |

(Continued)

FOREIGN PATENT DOCUMENTS

| CN | 101600539 | 12/2009 |
| CN | 102183819 | 9/2011 |

(Continued)

OTHER PUBLICATIONS

Notice of Allowance in Japanese Appln. No. 2023-120631, dated Jul. 4, 2024, 5 pages (with English translation).
(Continued)

*Primary Examiner* — Charlie Y Peng
(74) *Attorney, Agent, or Firm* — Fish & Richardson P.C.

(57) ABSTRACT

A plurality of waveguide display substrates, each waveguide display substrate having a cylindrical portion having a diameter and a planar surface, a curved portion opposite the planar surface defining a nonlinear change in thickness across the substrate and having a maximum height D with respect to the cylindrical portion, and a wedge portion between the cylindrical portion and the curved portion defining a linear change in thickness across the substrate and having a maximum height W with respect to the cylindrical portion. A target maximum height $D_t$ of the curved portion is $10^{-7}$ to $10^{-6}$ times the diameter, D is between about 70% and about 130% of $D_t$, and W is less than about 30% of $D_t$.

20 Claims, 6 Drawing Sheets

Related U.S. Application Data continuation of application No. 17/308,407, filed on May 5, 2021, now Pat. No. 11,487,061, which is a continuation of application No. 16/792,083, filed on Feb. 14, 2020, now Pat. No. 11,022,753.

(60) Provisional application No. 62/820,769, filed on Mar. 19, 2019, provisional application No. 62/805,832, filed on Feb. 14, 2019.

(51) Int. Cl.
*G02B 6/122* (2006.01)
*G02B 6/13* (2006.01)
*G02B 26/08* (2006.01)
*G02B 6/12* (2006.01)

(52) U.S. Cl.
CPC ............... *G02B 26/0891* (2013.01); *G02B 2006/12038* (2013.01); *G02B 2006/12061* (2013.01); *G02B 2006/12069* (2013.01); *G02B 2006/12197* (2013.01)

(56) References Cited

U.S. PATENT DOCUMENTS

| | | | |
|---|---|---|---|
| 5,914,760 A | 6/1999 | Daiku | |
| 6,206,535 B1 | 3/2001 | Hattori et al. | |
| 7,808,706 B2 * | 10/2010 | Fadel | G02B 6/005 349/95 |
| 8,436,366 B2 | 5/2013 | Harada et al. | |
| 11,409,122 B2 | 8/2022 | Blomstedt | |
| 2006/0061869 A1 | 3/2006 | Fadel et al. | |
| 2006/0275014 A1 | 12/2006 | Wilsher et al. | |
| 2009/0129720 A1 | 5/2009 | Asghari et al. | |
| 2010/0315719 A1 | 12/2010 | Saariko et al. | |
| 2013/0162997 A1 | 6/2013 | Kast et al. | |
| 2014/0168260 A1 | 6/2014 | O'Brien et al. | |
| 2014/0212090 A1 | 7/2014 | Wilcox et al. | |
| 2015/0178939 A1 | 6/2015 | Bradski et al. | |
| 2017/0357089 A1 | 12/2017 | Tervo et al. | |
| 2018/0131926 A1 | 5/2018 | Shanks et al. | |
| 2018/0210134 A1 | 7/2018 | Richards et al. | |
| 2020/0264371 A1 | 8/2020 | Bhargava et al. | |

FOREIGN PATENT DOCUMENTS

| | | | |
|---|---|---|---|
| EP | 1750569 B1 * | 5/2012 | ......... A61B 1/00096 |
| EP | 3428710 | 1/2019 | |
| JP | H03104545 A | 5/1991 | |
| JP | H04094122 A | 3/1992 | |
| JP | 2000-056151 | 2/2000 | |
| JP | 2010085867 A | 4/2010 | |
| JP | 2013-186198 | 9/2013 | |
| JP | 2013186198 A * | 9/2013 | |
| JP | 2014-157106 | 8/2014 | |
| JP | 2018163353 A | 10/2018 | |
| WO | WO 2005045908 | 5/2005 | |
| WO | WO 2005094449 | 10/2005 | |
| WO | WO 2017148232 | 9/2017 | |
| WO | 2018156894 A1 | 8/2018 | |

OTHER PUBLICATIONS

Akilian et al., "Thin optic constraint," Precision Engineering, Apr. 2007, 31(2):130-138.

Extended European Search Report in European Appln. No. 20756563.1, dated Nov. 21, 2022, 6 pages.

Office Action in Japanese Appln. No. 2021-547192, dated Apr. 25, 2023, 7 pages (with English translation).

PCT International Search Report and Written Opinion in International Appln. No. PCT/US2020/018437, dated Apr. 29, 2020, 8 pages.

* cited by examiner

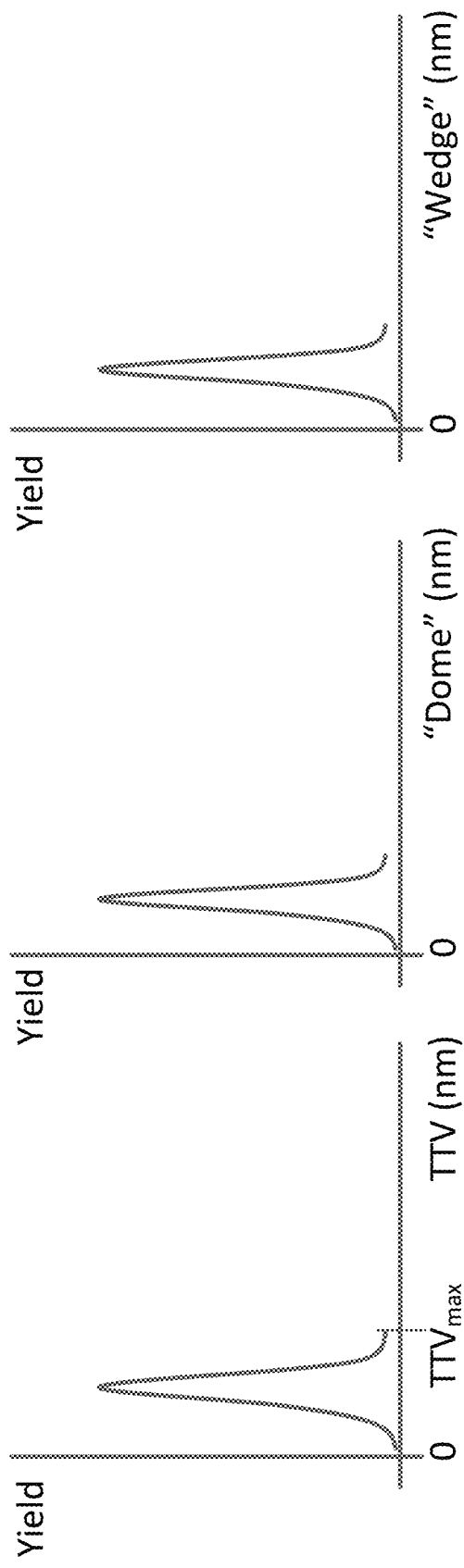
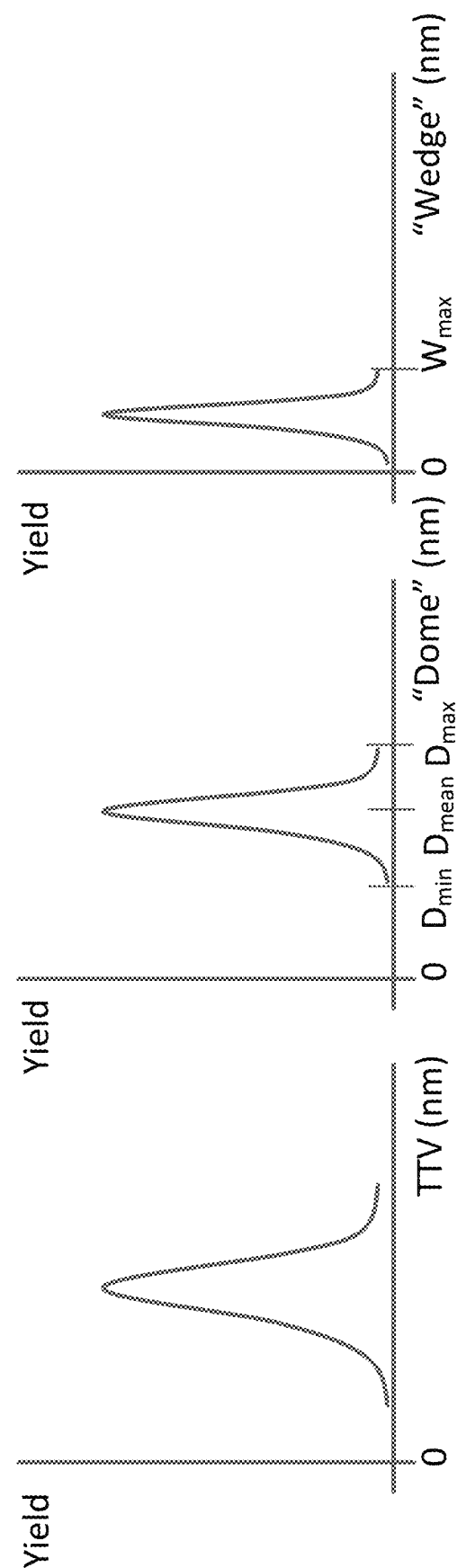

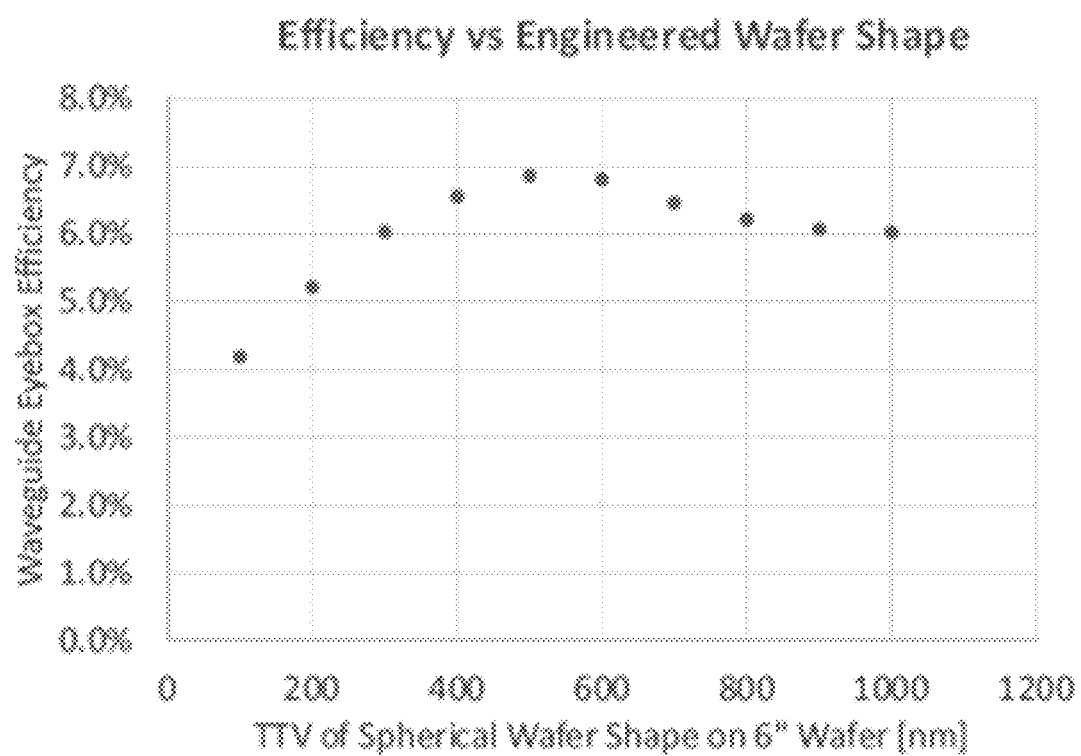
FIG. 7

BIASED TOTAL THICKNESS VARIATIONS IN WAVEGUIDE DISPLAY SUBSTRATES

CROSS-REFERENCE TO RELATED APPLICATIONS

This application is a continuation of U.S. patent application Ser. No. 17/938,869 filed Oct. 7, 2022, which is a continuation of U.S. patent application Ser. No. 17/308,407 filed May 5, 2021, now U.S. Pat. No. 11,487,061, which is a continuation of U.S. patent application Ser. No. 16/792,083 filed Feb. 14, 2020, now U.S. Pat. No. 11,022,753, which claims the benefit of U.S. Patent Application No. 62/805,832 filed Feb. 14, 2019, and 62/820,769 filed Mar. 19, 2019, all of which are herein incorporated by reference in their entirety.

TECHNICAL FIELD

This invention relates to biased total thickness variations in waveguide display substrates.

BACKGROUND

Optical imaging systems, such as wearable head-mounted systems, typically include one or more eyepieces that present projected images to a user. Eyepieces can be constructed using thin layers of one or more refractive materials. As examples, eyepieces can be constructed from one or more layers of highly refractive glass, silicon, metal, or polymer substrates.

In some cases, an eyepiece layer can be patterned (e.g., with one or more light diffractive nanostructures) such that it displays received light incoupled from an external projector. Further, multiple eyepieces layers (or "waveguides") can be used in conjunction to project a simulated three-dimensional image. For example, multiple waveguides—each having a specific pattern—can be layered, and each waveguide can relay specific light information of a portion of a volumetric image (e.g., wavelength or focal distance) such that in the aggregate of specific light information from each of the waveguides, the entire coherent volumetric image is viewable. Thus, the eyepieces can collectively present the full color volumetric image to the user across three-dimensions. This can be useful, for example, in presenting the user with a "virtual reality" environment.

Unintended variations in an eyepiece can reduce the quality of a projected image. Examples of such unintended variations include wrinkles, uneven thicknesses, and other physical distortions that can negatively affect the performance of the eyepiece.

SUMMARY

A first general aspect includes a plurality of waveguide display substrates, each waveguide display substrate having a cylindrical portion having a diameter and a planar surface, a curved portion opposite the planar surface defining a nonlinear change in thickness across the substrate and having a maximum height D with respect to the cylindrical portion, and a wedge portion between the cylindrical portion and the curved portion defining a linear change in thickness across the substrate and having a maximum height W with respect to the cylindrical portion. A target maximum height $D_t$ of the curved portion is $10^{-7}$ to $10^{-6}$ times the diameter, D is between about 70% and about 130% of $D_t$, and W is less than about 30% of $D_t$. For the plurality of waveguide display substrates, an average of D is $D_{mean}$, a maximum D for the plurality of waveguide display substrates is $D_{max}$, a minimum D for the plurality of waveguide display substrates is $D_{min}$, and a maximum W for the plurality of waveguide display substrates is $W_{max}$.

A second general aspect includes fabricating the plurality of waveguide display substrates of the first general aspect.

Implementations of the first and second general aspects may include one or more of the following features.

In some implementations, the nonlinear change in thickness is a quadratic change in thickness. The curved portion may be in the form of a dome. In some cases, the dome is spherical.

An average thickness of the plurality of waveguide display substrates is typically between about 200 microns and about 2000 microns. An average diameter of the plurality of waveguide display substrates is typically between about 2 centimeters and about 50 centimeters. $W_{max}/D_{mean}$ is typically less than about 0.3. $(D_{mean}-D_{min})/D_{mean}$ is typically less than about 0.3. $(D_{max}-D_{min})/D_{mean}$ is typically less than about 0.3. D is typically in a range of about 0.1 microns to about 5 microns. W is typically in a range of 0 to about 1.5 microns. An average total thickness variation of the plurality of substrates is typically between about 0.1 microns and about 6.5 microns.

In some implementations, the waveguide display substrates comprise a molded polymer. In certain implementations, the waveguide display substrates comprise a polished glass, silicon, or metal substrate.

Implementations of the second general aspect may include one or more of the following features.

In some cases, fabricating the plurality of waveguide display substrates may include polishing the waveguide display substrates, where the waveguide display substrates are formed of glass, metal, or silicon. In certain cases, fabricating the plurality of waveguide display substrates includes molding polymeric waveguide display substrates.

The second general aspect may further include forming one or more waveguides on each of the waveguide display substrates. The one or more waveguides may include at least two waveguides, and the waveguides may be positioned in a radial pattern on each waveguide display substrate.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 6A-6C show waveguide display substrate yield versus TTV, dome height, and wedge height for ultra-low TTV waveguide display substrates. FIGS. 6D-6F show waveguide display substrate yield versus TTV, dome height, and wedge height for biased TTV waveguide display substrates.

FIG. 7 shows waveguide eyebox efficiency versus "dome" height TTV (nm) of a spherical waveguide display substrate on a 6 inch waveguide display substrate for a typical diffractive waveguide display with 300 μm average thickness and 0 nm "wedge" TTV.

DETAILED DESCRIPTION

Total thickness variation (TTV) is one metric for improving performance of an optical waveguide. As used herein, TTV generally refers to the difference between the maximum and minimum values of the thickness of the waveguide or the waveguide display substrate on which the waveguide is formed. As light travels through an optical waveguide, typically by total internal reflection, variations in the thickness alter the light propagation path(s). Angular differences in the light propagation path(s) can affect image quality with field distortions, image blurring, and sharpness loss.

Figure 1:
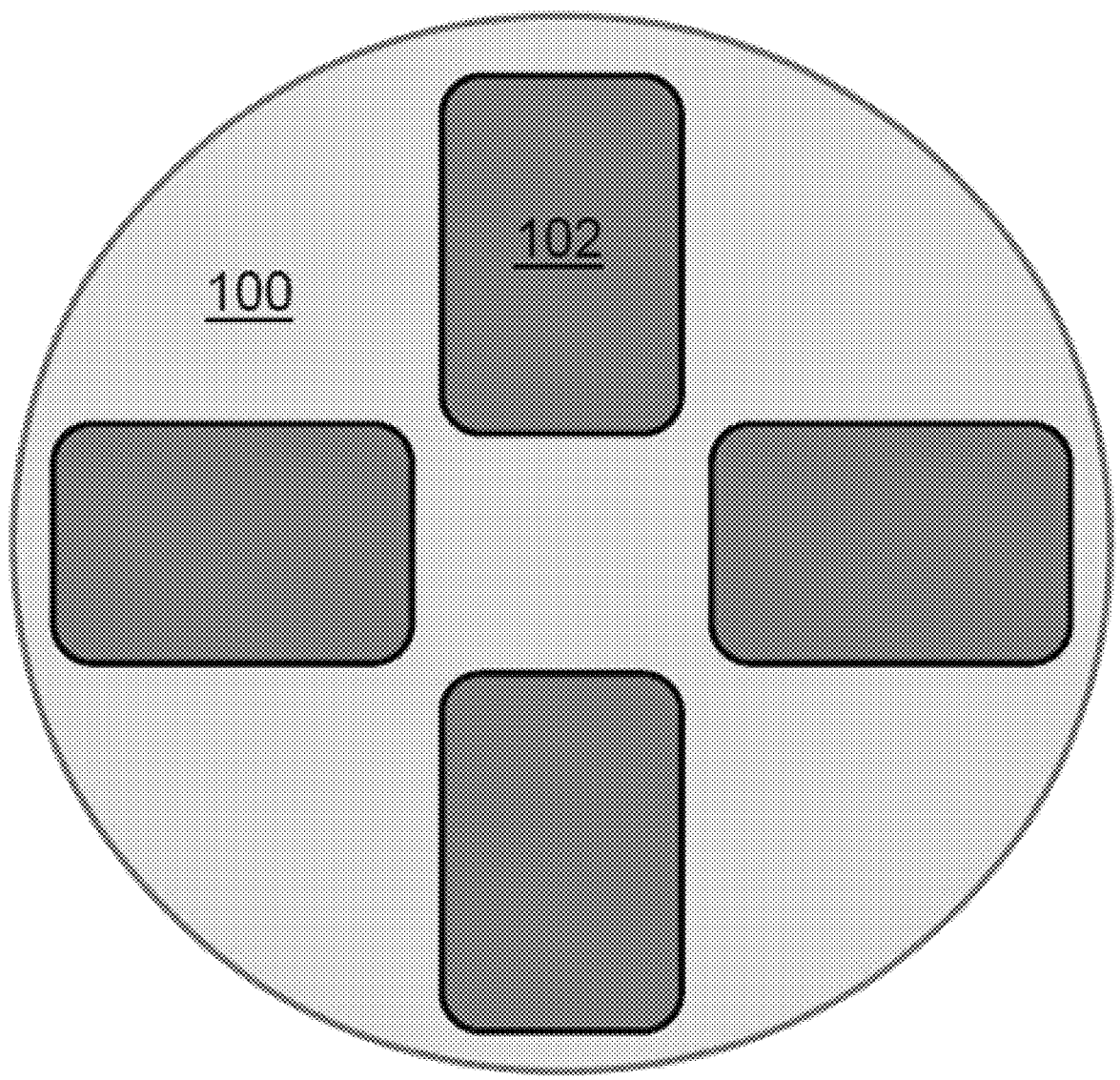
FIG. 1 depicts a sample waveguide display substrate with waveguide areas.
Figure 2A:
FIGS. 2A-2C depict polished waveguide display substrates having flat, convex, and concave cross-sectional shapes, respectively.
Figure 2B:
Figure 2C:

Waveguide preparation and processing typically occurs by arranging a number of waveguides to designated areas onto a waveguide display substrate (e.g., a wafer). FIG. 1 depicts waveguide display substrate 100 with a radial arrangement of waveguides 102. TTV can be reduced by fabricating a flat waveguide display substrate (i.e., a waveguide display substrate with zero TTV), for example, by polishing the substrate (e.g., a metal, glass or silicon substrate) or originally molding the substrate (e.g., a polymer substrate) with high-precision. However, polishing can produce a certain amount of curvature upon the waveguide display substrate and the resultant waveguides formed thereon. FIG. 2A depicts polished flat waveguide display substrate 200. FIGS. 2B and 2C depict polished convex waveguide display substrate 202 and polished concave waveguide display substrate 204, respectively. Though polishing can yield convex or concave curvatures, embodiments described herein are explained with reference to a convex curvature, such as that depicted in FIG. 2B.

Since completely flat polishing or molding, such as that depicted in FIG. 2A, requires extensive and costly processing to achieve, a certain degree of TTV is typically tolerated. With most low TTV processes for waveguide display substrates (e.g., 20 nm<TTV<2 μm), there exists a thickness shape or profile to the substrates that varies (e.g., randomly) from part to part. Here, "thickness shape" generally refers to the 3D mapping of the height difference between the substrate's top and bottom surfaces. In one example, a typical plano-convex lens has a thickness shape that is a convex spherical or positive "dome". In another example, a meniscus lens with the same radius of curvature on each surface (e.g., non-prescription sunglasses) has a flat near-zero TTV thickness shape but each surface itself is non-flat. As waveguides are stacked to form a multi-layer multi-color waveguide display, the random thickness shape differences can cause each color channel of red, green and blue to have a different luminance uniformity pattern. Differences in luminance uniformity pattern can cause the color to vary over the field of view when the waveguide stack is illuminated with a uniform white light image. These color non-uniformities can result in poorer image quality.

Figure 3A:
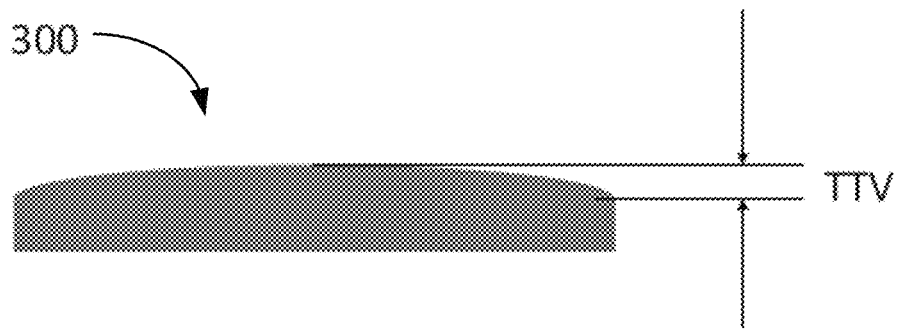
FIGS. 3A and 3B depict total thickness variation (TTV) comparisons of waveguide display substrates.
Figure 3B:
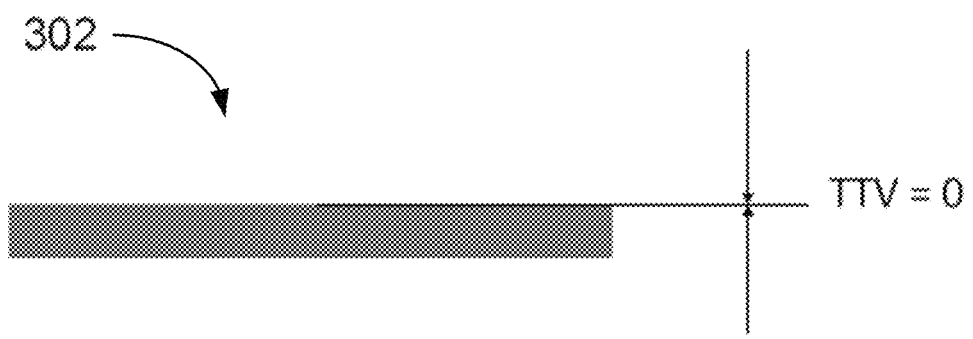
Figure 4:
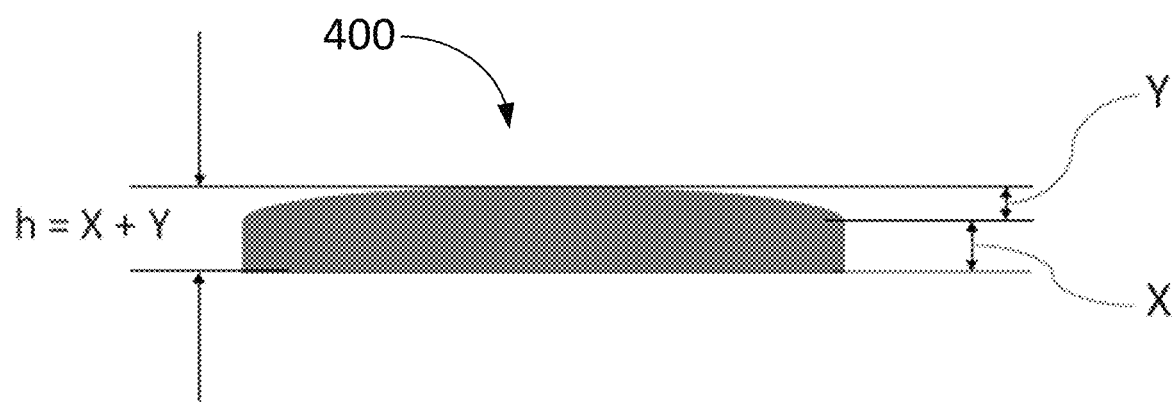
FIG. 4 depicts TTV of a polished waveguide display substrate with a convex surface.

Referring to FIG. 3A, waveguide display substrate 300 is shown having a TTV, measured as the highest point to the lowest point of the curved portion of the polished waveguide display substrate. Perfectly flat waveguide display substrate 302, depicted in FIG. 3B has a zero TTV. FIG. 4 depicts waveguide display substrate 400 having a minimum thickness X. That is, no part of the waveguide display substrate is thinner than X, and any thickness variation is measured as a thickness in addition to X. The greatest thickness is h, and the TTV mathematically is Y, where Y=h−X. TTV specifications are typically expressed as a maximum allowed TTV ($TTV_{max}$), and product specifications target a TTV (Y) below $TTV_{max}$ (i.e., $0 \leq Y < TTV_{max}$). Here, "ultra-low TTV" waveguide display substrates refers to waveguide display substrates for which the target TTV is zero (or as close to zero as practically possible).

In optical products, image quality and uniformity can be sensitive to a particular shape or profile of a polished waveguide display substrate as TTV approaches zero. In one example, the comparative difference of image quality (as measured by uniformity) of waveguides produced on a 20 nm TTV and a 40 nm TTV waveguide display substrate can be much higher than the comparative quality of waveguides produced on a 100 nm TTV substrate and a 120 nm waveguide display substrate, despite both pairs being only 20 nm different. Stated differently, a 100 nm TTV waveguide and a 120 nm waveguide can yield a more similarly uniform image than a 20 nm TTV waveguide and a 40 nm TTV waveguide (the former pair being more dome shaped as compared to the latter pair). The 100 nm TTV waveguide and 120 nm TTV waveguide can thus produce lower image variation and more consistent image uniformity across a product line.

Path length differences in the light propagation path(s) within a waveguide produced on a non-flat waveguide display substrate can also affect image quality with luminance pattern non-uniformities and color non-uniformities. The source of the luminance pattern non-uniformities includes electromagnetic interference patterns produced by numerous pathways through a pupil-replicating waveguide display substrate. A unit-cell of a typical pupil-replicating waveguide resembles a Mach-Zender interferometer, where there exist two pathways per unit-cell from the input to an output replicated pupil location. Pathlength differences between the two pathways are influenced by the pathlength through the thickness of the waveguide display substrate, which is defined by the TTV metric and thickness profile (whether the thickness changes linearly or quadratically and at an angle with respect to the light in total-internal-reflection within the waveguide display). If the pathlengths have equal or opposite phase, there may be constructive or destructive interference, respectively. Hence, the thickness shape may affect the magnitude within pupil-replicated copies and ultimately the output image outcoupled by the waveguide display.

Thus, it can be advantageous to minimize thickness shape variation as well as TTV. Since perfect replication may not be achieved in polishing or molding processes, certain manufacturing distributions can result. In a hypothetical distribution model, with a circular substrate shape defined by Zernike polynomials, a standard set of shape basis functions can be defined. There are even and odd Zernike polynomials. The even ones are defined as $$Z_n^m(\rho,\varphi)=R_n^m(\rho)\cos(m\varphi)$$

and the odd ones are defined as $$Z_n^{-m}(\rho,\varphi)=R_n^m(\rho)\sin(m\varphi),$$

where m and n are nonnegative integers with n≥m, is the azimuthal angle, ρ is the radial distance, and $R_n^m$ are the radial polynomials defined below. Zernike polynomials have the property of being limited to a range of −1 to +1, i.e. The radial polynomials $R^m_n$ are defined as $$R^m_n(\rho) = \sum_{k=0}^{\frac{n-m}{2}} \frac{(-1)^k (n-k)!}{k!\left(\frac{n+m}{2}-k\right)!\left(\frac{n-m}{2}-k\right)!} \rho^{n-2k}$$

for n−m even, and are identically 0 for n−m odd.

Image quality, in particular luminance uniformity, is non-linearly sensitive to thickness shape as TTV approaches zero. In other words, as TTV decreases below certain thresholds, image quality becomes increasingly varied among waveguides exhibiting even minor changes in thickness shape. To compensate for this anomaly, a biased TTV with a consistent thickness shape can be incorporated into substrate processing. As used herein, a "biased" TTV generally refers to a TTV having a nonzero target. More specifically, a "biased" TTV generally refers to a substrate thickness shape having one or more coefficients of Zernike fit polynomials with nonzero targets and all remaining coefficients of Zernike fit polynomials having zero targets. Consistency of thickness shape within a plurality of waveguide display substrates generally refers to a plurality of waveguide display substrates having a low variation of coefficients of Zernike fit polynomials. In the case of "biased" TTV, consistency of thickness shape refers to a set of waveguide display substrates having (i) all nonzero-targeted Zernike coefficients having minimal variation from their target magnitudes, for example the nonzero-targeted coefficients of all waveguide display substrates being about 70% to about 130% of their target magnitude, and (ii) all zero-targeted Zernike coefficients having an absolute magnitude substantially less than the nonzero-targeted Zernike coefficients, for example the zero-targeted coefficients being 0 to about 30% of the nonzero-targeted coefficients.

Figure 5:
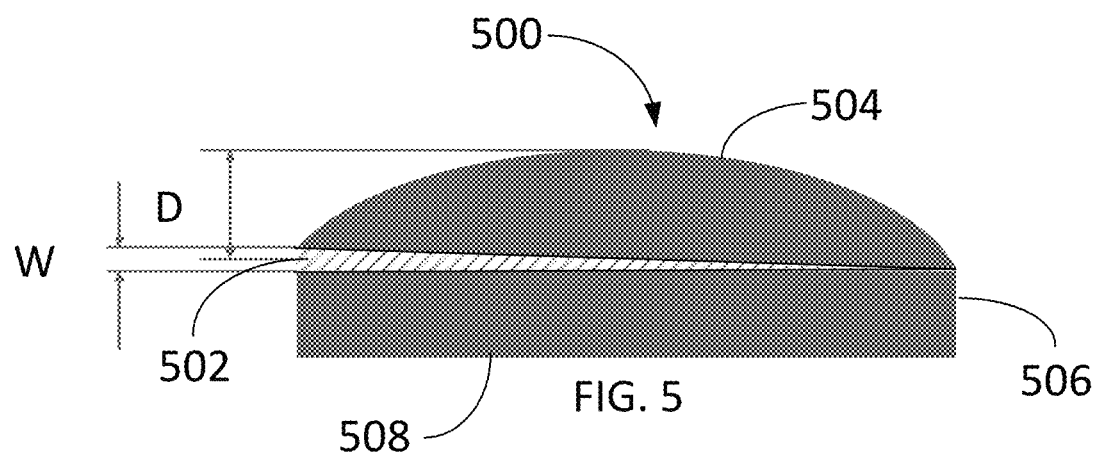
FIG. 5 shows a cross section of a waveguide display substrate with a biased TTV having linear (wedge) and nonlinear (dome) components.

An example of biased TTV and consistent substrate thickness shape is a substrate that is substantially polished (or molded) to a spherical shape with a TTV many times larger than the typical minimum TTV range of a substrate polishing (or molding) process. This substrate shape can be described as having wedge (linear change in thickness) and dome (quadratic change in thickness) components. FIG. 5 depicts waveguide display substrate 500 with wedge component 502 having height W, dome component 504 having height D, and cylindrical component 506 with planar surface 508 and having a thickness t and a diameter d. Using Zernike fit polynomials, an average thickness of the waveguide display substrate is $Z_0^0$, the height of the "wedge" component of TTV can be defined as sqrt($Z_1^{-1}+Z_1^1$), and the height of the convex "dome" component of TTV can be defined as $-2 \times Z_2^0$. An average thickness of the waveguide display substrate is typically between 200 μm and 2000 μm. In a substrate polishing or molding process that produces a "dome"-biased TTV, the waveguide display substrates may have a target "dome" height $D_t$ in the range of $10^{-7}$ to $10^{-6}$ of the substrate diameter, and each substrate may have a "dome" height less than 30% of the target "dome" height and a "wedge" height less than 30% of the target "dome" height. In one example, a plurality of waveguide display substrates having a diameter of 150 mm, a mean "dome" ($D_{mean}$) height of 1000 nm, a range of "dome" height ($D_{min}$ to $D_{max}$) of 700 nm to 1300 nm, and a maximum "wedge" height ($W_{max}$) of less than 300 nm will have increased efficiency, luminance uniformity and color uniformity and a reduced part-to-part variation in efficiency, luminance uniformity, and color uniformity compared to a plurality of waveguide display substrates having close-to-zero targeted TTV with "dome" and "wedge" height in the range of 0 to 300 nm. In the radial display layout of FIG. 1 and consistent-shape radially symmetric substrate thickness profiles biased to a dome, a consistent thickness change from a waveguide display input coupler to an output coupler can be achieved between the numerous parts arranged on a single substrate as well as from substrate to substrate. Such an arrangement of consistent thickness shape shows improved color uniformity and image quality compared to the typical ultra-low TTV with random thickness shapes used in conventional waveguide displays.

The biased TTV with consistent shape can be applied to the waveguide display substrate in numerous methods. For glass or crystalline substrates, it may be applied by polishing to a biased shape or by applying a coating with non-uniform thickness (of consistent shape and magnitude) to an ultra-low TTV waveguide display substrate with small but random thickness shape variation. For moldable polymer materials, the biased thickness profile can be designed into the mold that produces the waveguide display substrate.

FIGS. 6A-6C show waveguide display substrate yield versus TTV, dome height, and wedge height for ultra-low TTV waveguide display substrates. In these ultra-low TTV waveguide display substrates, the magnitude of dome height and wedge height are typically similar to each other. Also, the range of variation of dome height is similar in magnitude to the mean of the dome height. FIGS. 6D-6F show waveguide display substrate yield versus TTV, dome height, and wedge height for biased TTV waveguide display substrates. In these biased TTV waveguide display substrates, the magnitude of the dome height is larger than the magnitude of the wedge height, and the variation of the dome height is smaller than the mean dome height. FIGS. 6D-6F represent depict a biased relationship without reference to specific values. A specification for a biased TTV tolerance can be expressed as:

$W_{max}/D_{mean} \leq X$ $(D_{mean}-D_{min})/D_{mean} \leq Y$ $(D_{max}-D_{mean})/D_{mean} \leq Z$ With these relationships, X, Y, and Z typically range from 0 to 10 among different substrate polishing or molding processes. FIGS. 6A-6C show a set of waveguide display substrates that result in higher values of X, Y, and Z than the set of waveguide display substrates shown in FIGS. 6D-6F. As X, Y, and Z approach zero, as opposed to having TTV itself approach zero, overall efficiency of a plurality of waveguides produced on numerous subsections of numerous waveguide display substrates both increases and has fewer variations. Also, as X, Y, and Z approach zero, luminance uniformity and color uniformity among the resultant waveguides also increases and has fewer variations. In a typical substrate polishing or molding process, X, Y, and Z increase as the targeted TTV max approaches zero. Ultra-low TTV waveguide display substrates typically have X, Y and Z in the range of 1-10, and biased TTV waveguide display substrates have X, Y and Z in the range of 0 to 0.3, so a biased (or nonzero target) TTV can contribute toward improved waveguide display image quality.

FIG. 7 shows waveguide eyebox efficiency versus "dome" TTV (nm) of a spherical waveguide display substrate shape on a 6 inch wafer for a typical diffractive waveguide display with 300 μm average thickness and 0 nm "wedge" TTV. As seen in FIG. 7, eyebox efficiency is a maximum between a TTV of 400 nm and a TTV of 600 nm. Waveguide eyebox efficiency here refers to the sum of light entering a 15×20 mm$^2$ rectangular area 15 mm$^2$ away from the eye-side of a diffractive waveguide display's output grating relative to the sum of light incident on the waveguide display's input coupling grating as calculated by a typical diffractive waveguide simulation.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A waveguide display substrate comprising:
   a cylindrical portion having a planar surface;
   a curved portion opposite the planar surface, defining a nonlinear change in thickness across the substrate; and
   a wedge portion between the cylindrical portion and the curved portion, defining a linear change in thickness across the substrate, wherein a range of a dome height of the curved portion is between 700 nm and 1300 nm, and a maximum height of the wedge portion is less than 300 nm.

2. The waveguide display substrate of claim 1, wherein D is a maximum height of the curved portion with respect to the cylindrical portion, and wherein D is between 70% and 130% of a target maximum height Dt of the curved portion.

3. The waveguide display substrate of claim 1, wherein W is a maximum height of the wedge portion with respect to the cylindrical portion, and wherein W is less than 30% of a target maximum height Dt of the curved portion.

4. The waveguide display substrate of claim 1, wherein the nonlinear change in thickness is a quadratic change in thickness.

5. The waveguide display substrate of claim 1, wherein the curved portion in is the form of a dome.

6. The waveguide display substrate of claim 5, wherein the dome is spherical.

7. The waveguide display substrate of claim 1, wherein an average thickness of the waveguide display substrate is between about 200 microns and about 2000 microns.

8. The waveguide display substrate of claim 1, wherein an average diameter of the waveguide display substrate is between about 2 centimeters and about 50 centimeters.

9. The waveguide display substrate of claim 1, wherein the waveguide display substrate comprises a molded polymer.

10. The waveguide display substrate of claim 1, wherein the waveguide display substrate comprises at least one of a polished glass, silicon, or a metal substrate.

11. A method comprising:
    fabricating a waveguide display substrate such that the substrate comprises:
    a cylindrical portion having a planar surface;
    a curved portion opposite the planar surface and defining a nonlinear change in thickness across the substrate; and
    a wedge portion between the cylindrical portion and the curved portion, defining a linear change in thickness across the substrate, wherein a range of a dome height of the curved portion is between 700 nm and 1300 nm, and a maximum height of the wedge portion is less than 300 nm.

12. The method of claim 11, wherein D is a maximum height of the curved portion with respect to the cylindrical portion, and wherein the waveguide display substrate is fabricated such that D is between 70% and 130% of a target maximum height Dt of the curved portion.

13. The method of claim 11, wherein W is a maximum height of the wedge portion with respect to the cylindrical portion, and wherein the waveguide display substrate is fabricated such that W is less than 30% of a target maximum height Dt of the curved portion.

14. The method of claim 11, wherein the waveguide display substrate is fabricated such that the nonlinear change in thickness is a quadratic change in thickness.

15. The method of claim 11, wherein the waveguide display substrate is fabricated such that the curved portion in is the form of a dome.

16. The method of claim 15, wherein the waveguide display substrate is fabricated such that the dome is spherical.

17. The method of claim 11, wherein the waveguide display substrate is fabricated such that an average thickness of the waveguide display substrate is between about 200 microns and about 2000 microns.

18. The method of claim 11, wherein the waveguide display substrate is fabricated such that an average diameter of the waveguide display substrate is between about 2 centimeters and about 50 centimeters.

19. The method of claim 11, wherein the waveguide display substrate is fabricated using a molded polymer.

20. The method of claim 11, wherein the waveguide display substrate is fabricated using at least one of a polished glass, silicon, or a metal substrate.

* * * * *